United States Patent
Nakajima et al.

(10) Patent No.: US 8,044,770 B2
(45) Date of Patent: *Oct. 25, 2011

(54) KEYLESS ENTRY APPARATUS

(75) Inventors: Satoshi Nakajima, Miyagi-ken (JP); Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1021 days.

This patent is subject to a terminal disclaimer.

(21) Appl. No.: 11/936,301

(22) Filed: Nov. 7, 2007

(65) Prior Publication Data

US 2008/0106375 A1    May 8, 2008

(30) Foreign Application Priority Data

Nov. 7, 2006 (JP) ................................ 2006-301846

(51) Int. Cl.
*G08B 21/00* (2006.01)
(52) U.S. Cl. ............. 340/5.72; 340/426.13; 340/426.15; 340/426.16; 340/426.36
(58) Field of Classification Search ................ 340/5.72, 340/426.13, 426.15, 426.16, 426.36
See application file for complete search history.

(56) References Cited

U.S. PATENT DOCUMENTS

| | | | |
|---|---|---|---|
| 5,592,170 A * | 1/1997 | Price et al. ....................... | 342/22 |
| 7,224,980 B2 | 5/2007 | Hara | |
| 2004/0183714 A1* | 9/2004 | Yamashita et al. .............. | 342/70 |
| 2006/0267407 A1 | 11/2006 | Nagaoka et al. | |

* cited by examiner

*Primary Examiner* — Jennifer Mehmood
*Assistant Examiner* — Mark Rushing
(74) *Attorney, Agent, or Firm* — Brinks Hofer Gilson & Lione

(57) ABSTRACT

A keyless entry apparatus determines whether a portable apparatus is positioned inside/outside an interface of a vehicle. When an in-vehicle control unit detects that a portable apparatus is positioned in a region which is affected by crosstalk and/or in which saturation occurs, in the vicinities of some of a plurality of transmitting antennas, based on intensity data from some of the plurality of transmitting antennas, the in-vehicle control unit determines whether intensity data from the transmitting antenna is included in a data group composed of a plurality of intensity data that are transmitted from the transmitting antennas and then received by the portable apparatus when the portable apparatus is positioned along the inside of an interface. When it is determined that the intensity data is included/not included in the data group, the in-vehicle control unit determines that the portable apparatus is positioned inside/outside the vehicle.

5 Claims, 8 Drawing Sheets

KEYLESS ENTRY APPARATUS

CLAIM OF PRIORITY

This application claims benefit of the Japanese Patent Application No. 2006-301846 filed on Nov. 7, 2006, which is hereby incorporated by reference. tions are hereby incorporated by reference.

BACKGROUND

1. Field of the Invention

The present invention relates to a keyless entry apparatus that locks or unlocks a door by wireless communication between an in-vehicle apparatus and a portable apparatus, and more particularly, to a keyless entry apparatus capable of accurately determining whether a portable apparatus is positioned inside or outside a predetermined interface.

2. Description of the Related Art

A keyless entry apparatus that performs wireless communication between an in-vehicle apparatus and a portable apparatus carried by a user to lock or unlock a door of the vehicle has been known in the related art. In addition, a passive keyless entry apparatus having the following structure has been proposed: when a portable apparatus approaches a vehicle, communication is automatically performed between an in-vehicle apparatus and the portable apparatus to authenticate a unique portable apparatus ID, thereby locking or unlocking the door of the vehicle. Such a keyless entry apparatus is disclosed in U.S. Pat. No. 7,224,980 (corresponding to JP-A-2002-77972).

However, in the passive keyless entry apparatus, it is important to determine whether the portable apparatus is positioned inside or outside the vehicle. Therefore, a plurality of transmitting antennas are provided in the in-vehicle apparatus. When the portable apparatus receives radio waves from the transmitting antennas provided inside the vehicle, the in-vehicle apparatus determines that the portable apparatus is positioned inside the vehicle. On the other hand, when the portable apparatus receives radio waves from the transmitting antennas provided outside the vehicle, the in-vehicle apparatus determines that the portable apparatus is positioned outside the vehicle.

However, the keyless entry apparatus according to the related art does not have sufficient accuracy to determine the position of the portable apparatus. For example, when radio waves from the transmitting antennas provided inside the vehicle leak to the outside, the in-vehicle apparatus may determine that the portable apparatus is positioned inside the vehicle even though the portable apparatus is positioned outside the vehicle. On the other hand, when radio waves from the transmitting antennas provided outside the vehicle are transmitted to the inside of the vehicle, the in-vehicle apparatus may determine that the portable apparatus is positioned outside the vehicle even though the portable apparatus is positioned inside the vehicle. When the transmission power of radio waves from the transmitting antenna is lowered in order to prevent the leakage of radio waves, the portable apparatus may not receive radio waves inside the vehicle, which results in errors in the determination of the position of the portable apparatus.

In order to solve this problem, the inventors have designed a keyless entry apparatus having the following structure, which is disclosed in U.S. patent application Ser. No. 11/435680 (U.S. Patent Application Publication No. 2006/0267407): a plurality of transmitting antennas sequentially transmit signals such that transmission times do not overlap each other; a portable apparatus is moved along the inside and outside of an interface between an inner surface and an outer surface of the vehicle to acquire intensity data that is transmitted from the plurality of transmitting antennas to the portable apparatus at a plurality of positions beforehand, thereby creating an internal data group and an external data group; the portable apparatus detects the intensity of signals transmitted from the plurality of transmitting antennas; and it is determined whether the intensity data is closer to the internal data group or the external data group, thereby determining the position of the portable apparatus. An interface, which is a criterion for determining the position of the portable apparatus, is not limited to the interface between the inner surface and the outer surface of the vehicle.

However, the method of determining whether the intensity data acquired by the portable apparatus is close to the internal data group or the external data is complicated.

A transmitter for allowing the transmitting antennas to transmit radio waves includes circuit elements for the transmitting antennas. The circuit elements generate transmission signals, and allow the transmitting antennas to transmit radios waves. However, the signals generated by the circuit elements interact with each other, and the leakage of signals occurs between adjacent signal lines for connecting the transmitter to the transmitting antennas. The leakage amounts of signals from the vehicles are different from each other, and the leakage amount mainly depends on the twist of the signal lines. Therefore, it is difficult to equalize the leakage amount of signals.

Due to the leakage of signals, transmitting antennas other than a specific transmitting antenna that transmits radio waves also transmit weak radio waves. As a result, when the portable apparatus is positioned in a region that can detect the leaking radio waves, the portable apparatus receives the leaking radio waves in addition to the original radio waves, and thus received signal intensity becomes higher than the original received signal intensity. Therefore, in the method of determining whether the portable apparatus is positioned inside or outside the interface that has been proposed by the inventors, for example, when the user opens the door of the vehicle with the portable apparatus in his/her hand, the above-mentioned situation is likely to occur. When it is determined that the distance to the corresponding transmitting antenna is shorter than the actual distance, the receive signal intensity becomes higher than the original received signal intensity, and abnormal intensity data that should not be theoretically detected is measured. Specifically, for example, when three transmitting antennas transmit signals, a combination of intensity data transmitted from the three transmitting antennas corresponds to a specific point where the portable apparatus is positioned. However, when received signal intensity is higher than the original received signal intensity, the distance to the portable apparatus that corresponds to intensity data from one transmitting antenna may not overlap the position of the portable apparatus that is specified by intensity data from the other two transmitting antennas. In this case, a combination of intensity data becomes abnormal data. This may be similarly applied to the structure in which two transmitting antennas are provided.

Further, when each data group is acquired beforehand and a data group for a Mahalanobis reference space is created, abnormal data may be included in data of each data group, which results in the lowering of detection accuracy. The transmission of radio waves from transmitting antennas other than a specific transmitting antenna due to the leakage of signals is called crosstalk. When the portable apparatus detects leaking radio waves in a region in the vicinity of a transmitting antenna that is provided outside the vehicle, errors in the detection of the position of the portable apparatus occur due to the crosstalk.

Further, in the region in the vicinity of the transmitting antenna that is provided outside the vehicle, since the intensity of radio waves transmitted from the transmitting antenna is higher than that the receivable signal intensity of the portable apparatus, the signal intensity detected by the portable apparatus, which is a receiver side, is saturated to a constant value. In this case, the distance is not accurately calculated by the signal intensity detected by the portable apparatus, which causes errors in the detection of the position of the portable apparatus, similar to the crosstalk.

SUMMARY OF THE DISCLOSURE

A keyless entry apparatus includes an in-vehicle apparatus that is provided in a vehicle, and a portable apparatus. The in-vehicle apparatus includes: an in-vehicle transmitter that is connected to a plurality of transmitting antennas for transmitting request signals; an in-vehicle receiver that receives an answer signal; and an in-vehicle control unit that, when an answer signal transmitted from the portable apparatus is authenticated, performs a predetermined control process. The portable apparatus includes: a portable apparatus receiver that receives the request signals; a portable apparatus transmitter that transmits the answer signal; and a portable apparatus control unit that detects the intensity of each of the signals transmitted from the plurality of transmitting antennas of the in-vehicle apparatus. The in-vehicle control unit determines whether intensity data detected by the portable apparatus control unit is included in a data group composed of a plurality of intensity data that are transmitted from the plurality of transmitting antennas and received by the portable apparatus, when the portable apparatus is positioned on one side of a predetermined interface of the vehicle. When it is determined that the intensity data is included in the data group, the in-vehicle control unit determines that the portable apparatus is positioned on the one side of the predetermined interface. When it is determined that the intensity data is not included in the data group, the in-vehicle control unit determines that the portable apparatus is positioned on the other side of the predetermined interface.

According to another aspect of the invention, a keyless entry apparatus includes an in-vehicle apparatus that is provided in a vehicle, and a portable apparatus. The in-vehicle apparatus includes: an in-vehicle transmitter that is connected to a plurality of transmitting antennas for transmitting request signals; an in-vehicle receiver that receives an answer signal; and an in-vehicle control unit that, when an answer signal transmitted from the portable apparatus is authenticated, performs a predetermined control process. The portable apparatus includes: a portable apparatus receiver that receives the request signals; a portable apparatus transmitter that transmits the answer signal; and a portable apparatus control unit that detects the intensity of each of the signals transmitted from the plurality of transmitting antennas of the in-vehicle apparatus. When the in-vehicle control unit detects that the portable apparatus is positioned in a predetermined limited region in the vicinities of some of the plurality of transmitting antennas on the basis of intensity data from some of the plurality of transmitting antennas that is detected by the portable apparatus control unit, the in-vehicle control unit determines whether intensity data from the other transmitting antennas that is detected by the portable apparatus is included in a limited data group composed of a plurality of intensity data that are transmitted from the other transmitting antennas and then received by the portable apparatus when the portable apparatus is positioned along the inside of an interface between an inner surface and an outer surface of the vehicle in the predetermined limited region. When it is determined that the intensity data is included in the limited data group, the in-vehicle control unit determines that the portable apparatus is positioned inside the vehicle. When it is determined that the intensity data is not included in the limited data group, the in-vehicle control unit determines that the portable apparatus is positioned outside the vehicle.

In the keyless entry apparatus according to the above-mentioned aspect, preferably, the in-vehicle control unit calculates a Mahalanobis distance between the limited data group and the intensity data that is transmitted from the other transmitting antennas and detected by the portable apparatus control unit. Preferably, when the calculated Mahalanobis distance value is smaller than a boundary value of a Mahalanobis distance that is calculated beforehand and is considered as the limited data group, the in-vehicle control unit determines that the intensity data is included in the limited data group. Preferably, when the calculated Mahalanobis distance value is larger than the boundary value, the in-vehicle control unit determines that the intensity data is not included in the limited data group.

According to a keyless entry apparatus of an embodiment, the in-vehicle control unit determines whether intensity data detected by the portable apparatus control unit is included in a data group composed of a plurality of intensity data that are transmitted from the plurality of transmitting antennas and received by the portable apparatus when the portable apparatus is positioned on one side of a predetermined interface of the vehicle. When it is determined that the intensity data is included in the data group, the in-vehicle control unit determines that the portable apparatus is positioned on the one side of the predetermined interface. On the other hand, when it is determined that the intensity data is not included in the data group, the in-vehicle control unit determines that the portable apparatus is positioned on the other side of the predetermined interface. According to the above-mentioned structure, a data group for only one side of the interface is prepared, and it is determined whether acquired intensity data is included in the data group, thereby determining at which side of the interface the portable apparatus is positioned. As a result, it is possible to easily determine whether the portable apparatus is positioned inside or outside the vehicle.

According to a keyless entry apparatus of another embodiment, when the in-vehicle control unit detects that the portable apparatus is positioned in a predetermined limited region in the vicinities of some of the plurality of transmitting antennas on the basis of intensity data from some of the plurality of transmitting antennas that is detected by the portable apparatus control unit, the in-vehicle control unit determines whether intensity data from the other transmitting antennas that is detected by the portable apparatus is included in a limited data group composed of a plurality of intensity data that are transmitted from the other transmitting antennas and then received by the portable apparatus when the portable apparatus is positioned along the inside of an interface between an inner surface and an outer surface of the vehicle in the predetermined limited region. When it is determined that the intensity data is included in the limited data group, the in-vehicle control unit determines that the portable apparatus is positioned inside the vehicle. When it is determined that the intensity data is not included in the limited data group, the in-vehicle control unit determines that the portable apparatus is positioned outside the vehicle. According to the above-mentioned structure, it is possible to determine whether the portable apparatus is positioned inside or outside the vehicle in a predetermined region, without using abnormal intensity data.

According to the above-mentioned embodiments, in the keyless entry apparatus, the in-vehicle control unit calculates a Mahalanobis distance between the limited data group and the intensity data that is transmitted from the other transmitting antennas and detected by the portable apparatus control unit. When the calculated Mahalanobis distance value is smaller than a boundary value of a Mahalanobis distance that is calculated beforehand and is considered as the limited data group, the in-vehicle control unit determines that the intensity data is included in the limited data group. On the other hand, when the calculated Mahalanobis distance value is larger than the boundary value, the in-vehicle control unit determines that the intensity data is not included in the limited data group. According to the above-mentioned structure, it is possible to accurately determine whether the portable apparatus is positioned inside the vehicle on the basis of the Mahalanobis distance.

According to the above-mentioned embodiments, in the keyless entry apparatus, when the in-vehicle control unit detects that the portable apparatus is positioned in regions other than the limited region in the vicinities of some of the plurality of transmitting antennas on the basis of the intensity data from some of the plurality of transmitting antennas that is detected by the portable apparatus, the in-vehicle control unit determines whether the intensity data that is detected by the portable apparatus control unit is closer to a first data group, which includes a plurality of intensity data that are transmitted from the plurality of transmitting antennas and then received by the portable apparatus and excludes intensity data in a predetermined limited region in the vicinities of the transmitting antennas when the portable apparatus is positioned along the outside of the interface between the inner surface and the outer surface of the vehicle, or a second data group, which includes a plurality of intensity data that are transmitted from the plurality of transmitting antennas and then received by the portable apparatus and excludes intensity data in a predetermined limited region in the vicinities of the transmitting antennas when the portable apparatus is positioned along the inside of the interface between the inner surface and the outer surface of the vehicle. The in-vehicle control unit determines whether the portable apparatus is positioned inside or outside the vehicle on the basis of the result of the determination. According to the above-mentioned structure, it is possible to accurately determine the position of the portable apparatus in regions other than the limited region.

According to the above-mentioned embodiments, in the keyless entry apparatus, the in-vehicle control unit calculates the Mahalanobis distances between the intensity data detected by the portable apparatus control unit and the first and second data groups, and the in-vehicle control unit determines that the intensity data is close to the data group having a shorter Mahalanobis distance. According to the above-mentioned structure, it is possible to accurately determine the position of the portable apparatus in regions other than the predetermined limited region.

DESCRIPTION OF THE EMBODIMENT

Figure 1:
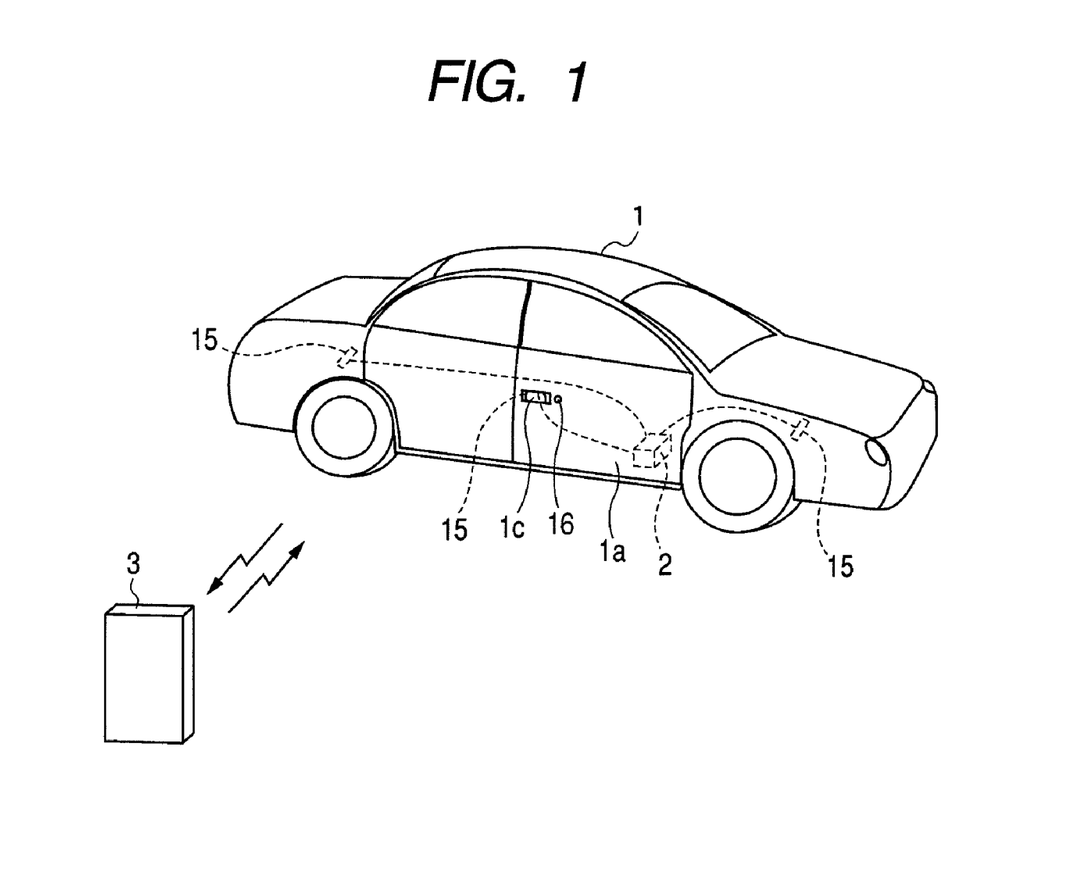
FIG. 1 is a diagram schematically illustrating a keyless entry apparatus according to an embodiment of the disclosure.

Hereinafter, exemplary embodiments of the disclosure will be described in detail with respect to the accompanying drawings. FIG. 1 is a diagram schematically illustrating a keyless entry apparatus according to an embodiment of the disclosure. The keyless entry apparatus according to this embodiment is used to lock or unlock a door $1a$ of a vehicle 1, and wireless communication is performed between an in-vehicle apparatus 2 that is provided in the vehicle 1 and a portable apparatus 3 that is carried by a user to execute authentication or to lock or unlock the door of the vehicle. The in-vehicle apparatus 2 includes a plurality of transmitting antennas 15 provided inside and outside the vehicle 1, and transmits request signals to the portable apparatus 3 through the transmitting antennas 15. One of the transmitting antennas 15 is provided in a door handle $1c$ of the door $1a$. The request signal is a low-frequency signal.

Next, a case in which the user approaches the vehicle 1 to unlock the door $1a$ will be described below. In this embodiment, the user having the portable apparatus 3 needs to push a request switch 16 that is provided in the vicinity of a door handle $1c$ of the door $1a$ in order to unlock the door $1a$. When the request switch 16 is pushed, communication for authentication is performed between the in-vehicle apparatus 2 and the portable apparatus 3. When the authentication succeeds, the in-vehicle apparatus 2 unlocks the door $1a$.

Figure 2:
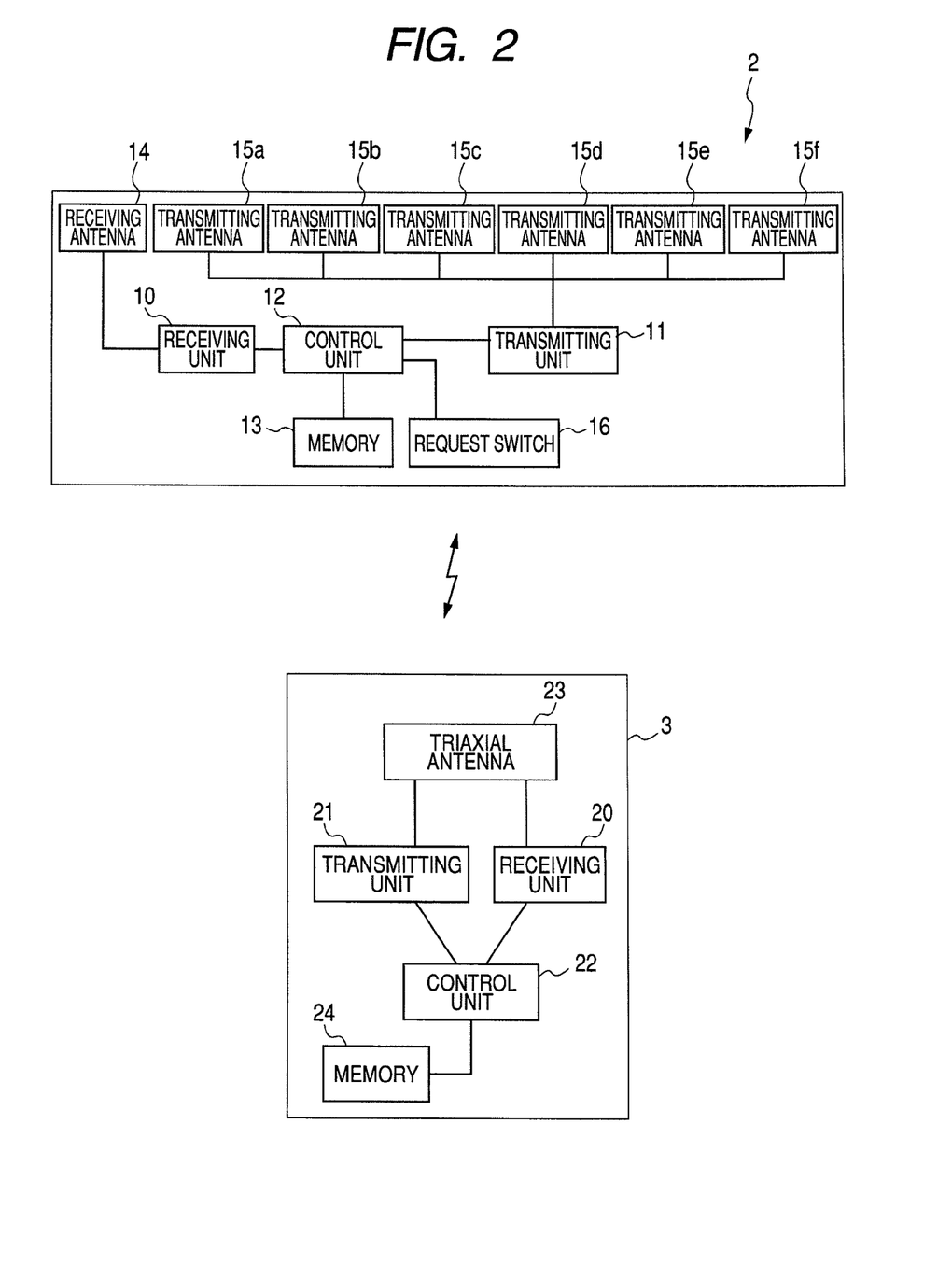
FIG. 2 is a block diagram illustrating the structure of an in-vehicle apparatus.

Next, the structures of the in-vehicle apparatus 2 and the portable apparatus 3 will be described below. FIG. 2 is a block diagram illustrating the structure of the keyless entry apparatus. As shown in FIG. 2, the in-vehicle apparatus 2 includes an in-vehicle receiver 10 that receives answer signals from the portable apparatus 3, an in-vehicle transmitter 11 that transmits request signals to the portable apparatus 3, and an in-vehicle control unit 12 that performs various control operations when receiving the answer signal or when the request switch 16 is pushed.

In addition, the in-vehicle control unit 12 is connected to the request switch 16 and a memory 13 that stores information required to perform a control operation, such as V-ID, which is unique vehicle identification, and IDs of a plurality of portable apparatuses capable of operating one vehicle. Further, the in-vehicle receiver 10 is connected to a receiving antenna 14 for receiving the answer signals, and the in-vehicle transmitter 11 is connected to a plurality of transmitting antennas 15 for transmitting the request signals. The plurality of transmitting antennas 15 are provided inside and outside the vehicle 1.

The portable apparatus 3 includes a portable apparatus receiver 20 that receives the request signals from the in-vehicle apparatus 2, a portable apparatus transmitter 21 that transmits the answer signal to the in-vehicle apparatus 2, a portable apparatus control unit 22 that performs various control operations when the request signals are received, and a memory 24 that stores a portable apparatus ID and V-ID. A triaxial antenna 23 that has directional characteristics orthogonal to each other and transmits or receives the request signals or the answer signal is connected to the portable apparatus receiver 20 and the portable apparatus transmitter 21.

The portable apparatus control unit 22 is switched from a sleep state in which little power is consumed to a normal state by a wake-up signal included in the request signal that is transmitted from the in-vehicle apparatus 2 to the portable apparatus receiver 20. In addition, the portable apparatus control unit 22 performs various operations according to commands included in the request signal. The portable apparatus control unit 22 can detect the intensity of the signal received by the triaxial antenna 23.

Figure 3:
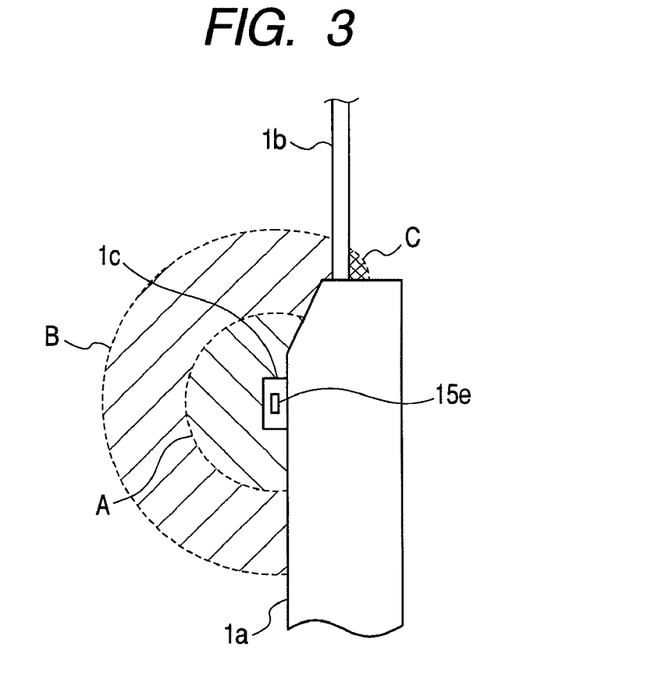
FIG. 3 is a block diagram illustrating the structure of a portable apparatus.

Next, a region in the vicinity of the door 1a of the vehicle 1 that is affected by crosstalk and saturation will be described below. FIG. 3 is a cross-sectional view illustrating the door 1a taken along the vertical direction of FIG. 1. As shown in FIG. 3, a window 1b is provided at an upper part of the door 1a, the door handle 1c is provided on the outer surface of the door 1a, and a transmitting antenna 15e is provided in the door handle 1c. In a predetermined region having the transmitting antenna 15e as its center, that is, in a substantially spherical region, errors in the detection of the position of the portable apparatus 3 may occur due to crosstalk and saturation. The region is determined by only the intensity of the signal received by the portable apparatus 3 from the transmitting antenna 15e.

In FIG. 3, in a region A having the transmitting antenna 15 as its center outside the vehicle, errors in the detection of the position of the portable apparatus 3 is likely to occur due to crosstalk. That is, when the position of the portable apparatus 3 is determined on the basis of the signal transmitted from the transmitting antenna 15 provided in the door handle 1c, with the portable apparatus 3 being positioned in the region A, signal intensity that is higher than the actual signal intensity is detected due to the crosstalk, and the measured distance between the portable apparatus 3 and the transmitting antenna 15 is likely to be shorter than the actual distance therebetween. Further, actually, the region A outside the vehicle is set in consideration of the maximum crosstalk. In FIG. 3, in a region B having the transmitting antenna 15 as its center outside the vehicle, errors in the detection of the position of the portable apparatus 3 occur due to saturation. That is, when the position of the portable apparatus 3 is determined on the basis of the signal transmitted from the transmitting antenna 15 provided in the door handle 1c, with the portable apparatus 3 being positioned in the region B, signal intensity that is lower than the actual signal intensity is detected due to saturation, and the measured distance between the portable apparatus 3 and the transmitting antenna 15 is likely to be longer than the actual distance therebetween. Further, actually, the region B outside the vehicle is set in consideration of maximum transmission intensity. In this way, when the portable apparatus 3 is positioned in the region A or the region B, the distance between the portable apparatus 3 and the transmitting antenna 15 provided in the door handle 1c does not match with the distances between the portable apparatus 3 and the other transmitting antennas 15, which results in errors in the determination of the position of the portable apparatus 3 inside or outside the vehicle.

Generally, radio waves from the transmitting antenna 15 provided in the door handle 1c are transmitted to only the outside of the vehicle, but the transmission of radio waves to the inside of the vehicle is electromagnetically shielded by the door 1a that is formed of a metal plate. The window 1b that is formed of glass transmitting radio waves is provided at the upper part of the door 1a. However, since the door 1a shields radio waves a little, a position inside the vehicle that has the same signal intensity as an outermost portion of the region B is represented by an outer circumferential line of a region C, and the region C has a spherical shape having a radius that is slightly smaller than that of the region B. In this embodiment, the region C is not affected by crosstalk, but is affected by saturation, similar to the region B. In addition, the range of the region C is changed according to the distance between the window 1b and the transmitting antenna 15 provided in the door handle 1c or the range of the region A. For example, the region C may have the same range as the region A.

In this embodiment, different methods are used to detect the position of the portable apparatus 3 in the regions A, B, and C shown in FIG. 3, on the basis of the intensity of the signal transmitted from the transmitting antenna 15 provided in the door handle 1c. The methods will be described in detail below.

Figure 4:
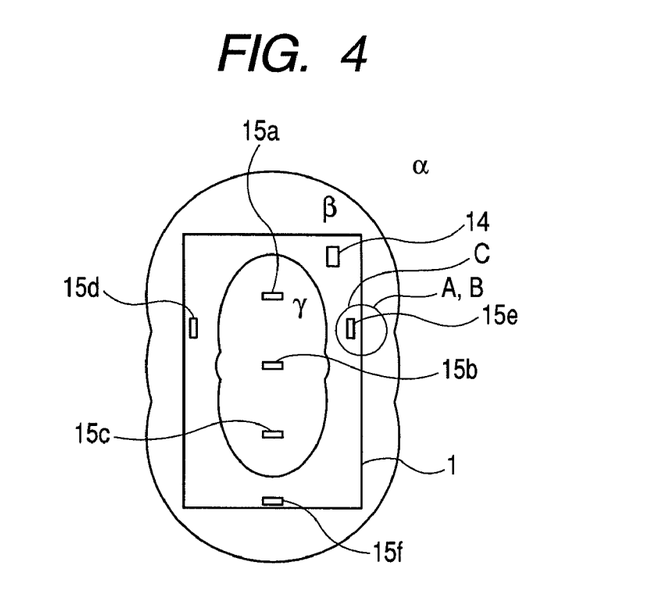
FIG. 4 is a diagram illustrating the positions of antennas provided in a vehicle.

FIG. 4 shows the arrangement of the receiving antenna 14 and the transmitting antenna 15 in the vehicle 1. One receiving antenna 14 is provided in the vehicle 1, but a plurality of transmitting antennas 15a to 15f are provided inside and outside the vehicle 1. In this embodiment, three transmitting antennas 15a to 15c are provided inside the vehicle 1 and three transmitting antennas 15d to 15f are provided outside the vehicle 1. In this structure, it is assumed that the transmitting antenna 15e is provided in the door handle 1c. That is, the region A, the region B, and the region C shown in FIG. 3 are arranged in the vicinity of the transmitting antenna 15e in FIG. 4.

In this embodiment, it is determined whether the portable apparatus 3 is positioned in the inside or the outside of an interface between the inner surface and the outer surface of the vehicle 1. However, as described above, when the portable apparatus 3 is not positioned in any of the regions A, B, and C shown in FIG. 3, for example, when the portable apparatus 3 is positioned in the vicinity of the interface between the inner surface and the outer surface of the vehicle and when the portable apparatus 3 is spaced from the interface between the inner surface and the outer surface of the vehicle by a predetermined distance or more, different determining methods are used. In this embodiment, the interface between the inner surface and the outer surface of the vehicle corresponds to a frame of the vehicle. In this embodiment, the interface between the inner surface and the outer surface of the vehicle is a criterion for determining the inside or the outside of the vehicle, and means a boundary that expands in the plane direction. For example, the interface between the inner surface and the outer surface of the vehicle includes a geometrical surface, a virtual surface, and a predetermined object. In FIG. 4, the inside of an overlapping region between two elliptical spheres inside the vehicle 1 is referred to as γ, the outside of an overlapping region among three spheres outside the vehicle 1 is referred to as α, and a region between the outside of the overlapping region between the two elliptical spheres inside the vehicle 1 and the overlapping region among the three spheres outside the vehicle 1 is referred to as β. When the portable apparatus 3 is positioned in the region α or the region γ that is spaced from the interference between the inner surface and the outer surface of the vehicle by a predetermined distance or more, a method, which is simple and easy, but is not accurate, is used to determine the position of the portable apparatus 3. Meanwhile, when the portable apparatus 3 is positioned in the region β corresponding to the vicinity of the interface between the inner surface and the outer surface of the vehicle, an accurate method is used to determine the position of the portable apparatus 3.

These regions are set as follows. First, the portable apparatus 3 is moved along the interface between the inner surface and the outer surface of the vehicle to measure the intensities of the signals transmitted from the transmitting antennas 15 at a plurality of positions in the vicinity of the interface between the inner surface and the outer surface, and the distance to each antenna is calculated on the basis of the measured signal intensities. In addition, the relationship between the intensities of the signals and the distances is measured beforehand. In this embodiment, the intensities of the signals transmitted from the transmitting antennas 15a to 15c provided in the vehicle 1 are detected, and the distances to the transmitting antennas 15a to 15c are measured.

Next, a method of specifying the region γ will be described. Among data for all of the positions, a position closest to the transmitting antenna 15a, a position closest to the transmitting antenna 15b, and a position closest to the transmitting antenna 15c are specified, and a spherical surface is specified by using the distances as MINLa, MINLb, and MINLc. In general, the position closest to the transmitting antenna 15a corresponds to the center of a front glass of the vehicle when the portable apparatus 3 is moved along the inner surface of the vehicle, and the positions closest to the transmitting antennas 15b and 15c correspond to points that are positioned in the horizontal direction (the horizontal direction of FIG. 4) of the transmitting antennas when the portable apparatus 3 is moved along the inner surface of the vehicle.

At all of the positions, a distance La to the transmitting antenna 15a is added to a distance Lb to the transmitting antenna 15b to obtain a distance La+Lb. Then, among the distances, a minimum value is specified, and a surface in which the distance La+Lb has a minimum value, that is, an ellipsoidal surface having the transmitting antenna 15a and the transmitting antenna 15b as two focal points is specified. Similarly, the distance Lb to the transmitting antenna 15b is added to a distance Lc to the transmitting antenna 15c to obtain a distance Lb+Lc, and an ellipsoidal surface having the transmitting antenna 15b and the transmitting antenna 15c as two focal points is specified.

The inside of an outer circumferential surface of a figure formed by two elliptical spheres and three spheres that are defined by the distances MINLa, MINLb, and MINLc is referred to as the region γ. For the size of a sphere or an elliptical sphere, the above-mentioned values may be multiplied by a value that is smaller than 1, or a predetermined value may be subtracted from the above-mentioned values, in order to slightly reduce the area of the region γ. However, when the area of the region γ is excessively reduced, the region cannot perform its function, which is not preferable. In this embodiment, the ellipsoidal surface is specified by the distance to the antenna, but it may be specified by intensity data. In this case, the region can be directly determined from the intensity data in a determining process, which will be described later. Further, in this embodiment, three spherical regions and two ellipsoidal regions are set inside the vehicle, but the three spherical regions or the two ellipsoidal regions may be set inside the vehicle.

Next, a method of specifying the region α will be described. The region α is specified by the intensity of the signal transmitted from each of the transmitting antennas 15 when the portable apparatus 3 is moved along the inner surface of the vehicle 1. Specifically, for data measured at all of the positions, the positions closest to the transmitting antennas 15 are specified to create a set a of positions closest to the transmitting antenna 15a, a set b of positions closest to the transmitting antenna 15b, and a set c of positions closest to the transmitting antenna 15c. A front region of the vehicle 1 is closest to the transmitting antenna 15a, and data acquired from the region corresponds to data for the set a. A rear region of the vehicle 1 is closest to the transmitting antenna 15c, and data acquired from the region corresponds to data for the set c. An intermediate region between the front region and the rear region of the vehicle 1 is closest to the transmitting antenna 15b, and data acquired from the region corresponds to data for the set b. Then, in the set a, the maximum value of the distance to the transmitting antenna 15a is specified, and is multiplied by a number larger than 1. Subsequently, a spherical surface having the multiplied value as a radius and the transmitting antenna 15 as its center is specified. The same process is also performed on the sets b and c. In this way, three spherical surfaces are specified.

In this embodiment, data obtained when the portable apparatus is moved along the inner surface of the vehicle is used, but the invention is not limited thereto. For example, data obtained when the portable apparatus is moved along the outer surface of the vehicle may be used. In this embodiment, the maximum value of the distance to the transmitting antenna 15a is multiplied by a number larger than 1, but a predetermined number may be added to the maximum value of the distance to the transmitting antenna 15a, that is, the area of the region α may be slightly reduced. However, when the area of the region α is excessively reduced, the region cannot perform its function, which is not preferable. The outside of the three spherical surfaces is used as the region α, and in the inside of the three spherical surfaces, the outside of the two ellipsoidal surfaces is used as the region β.

The memory 13 of the in-vehicle apparatus 2 stores an ID for authenticating the portable apparatus 3, data for determining the position of the portable apparatus 3 in the regions A, B, and C, data for determining the position of the portable apparatus 3 in the vicinity of the interface between the inner surface and the outer surface of the vehicle, and data for determining the regions α, β, and γ. Data for determining the position of the portable apparatus 3 in the region β is calculated from an internal data group and an external data group that include a plurality of data obtained by associating the intensity of radio waves from each transmitting antenna 15 with IDs of the transmitting antennas 15 in the inside and the outside of the vehicle 1, respectively. In addition, data for determining the position of the portable apparatus 3 when the portable apparatus 3 is disposed in the region A, the region B, or the region C is calculated from a door neighborhood internal data group that includes a plurality of data obtained by associating the intensity of radio waves from each transmitting antenna 15 in the region C with IDs of the transmitting antennas 15.

Each data component in the internal data group includes identification information of the transmitting antenna 15 and radio field intensity corresponding thereto, for four radio waves having the highest intensity, among the radio waves transmitted from the transmitting antennas 15 in the vicinity of the interface between the inner surface and the outer surface of the vehicle 1 inside the vehicle 1. Each data component is acquired from the entire inner surface of the vehicle 1 beforehand, and data in the region C in the vicinity of the transmitting antenna 15e provided in the door handle 1c is excluded from the acquired data, thereby forming the internal data group (which corresponds to the second data group in claims). The internal data group may include the acquired data without excluding the data in the region C when it is ascertained through experiments that, although the acquired data includes the data in the region C, the accuracy of determination is hardly lowered when the portable apparatus 3 is positioned in regions other than the region C. In the region C, data for the intensity of radio waves transmitted from the transmitting antennas 15 other than the transmitting antenna 15e is acquired to form a door neighborhood internal data group.

The external data group (which corresponds to the first data group in claims) is formed by the same method as that in which the internal data group is formed. That is, data is acquired from the entire outer surface of the vehicle 1 in the vicinity of the interface between the inner surface and the outer surface of the vehicle 1 outside the vehicle 1, and data components in the regions A and B in the vicinity of the transmitting antenna 15e provided in the door handle 1c are excluded from the acquired data. The external data group may include the acquired data without excluding the data components in the regions A and B when it is ascertained through experiments that, although the acquired data includes the data components in the regions A and B, the accuracy of determination is hardly lowered when the portable apparatus 3 is positioned in regions other than the regions A and B.

Figure 5:
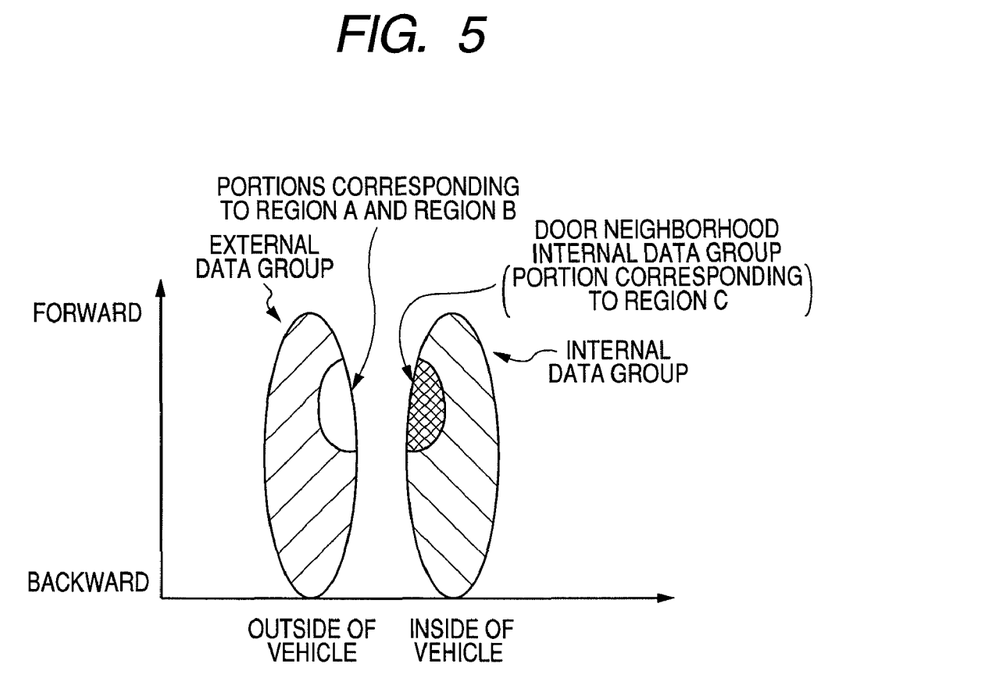
FIG. 5 is a diagram illustrating the conceptual relationship among an internal data group, an external data group, a door neighborhood internal data group, and portions corresponding to regions A and B.

FIG. 5 shows the conceptual relationship among the internal data group, the external data group, the door neighborhood internal data group, and portions corresponding to the regions A and B. In FIG. 5, the horizontal direction indicates the internal and external directions of the vehicle 1, and the vertical direction indicates the forward and backward directions of the vehicle 1. In addition, regions in FIG. 5 conceptually show the distribution of the acquired data. As shown in FIG. 5, the external data group is acquired so as to cover a region from which portions corresponding to the regions A and B are excluded, and the internal data group is acquired so as to cover a region from which a portion corresponding to the region C is excluded. In addition, the door neighborhood internal data group is acquired as data for the portion corresponding to the region C so as to cover the portion corresponding to the region C that is excluded from the internal data group.

The data acquiring process is performed on the actual vehicle 1 during the development of a product, by using the portable apparatus 3 or an intensity measuring apparatus. Alternatively, the data acquiring process may be performed on a manufacturing line. Specifically, first, in consideration of a variation in each vehicle 1, a maximum region in which errors in the determination of the position of the portable apparatus likely occur due to saturation and crosstalk, or a region having a little margin for errors is specified in the vicinity of the transmitting antenna 15e. Then, a first received signal intensity value corresponding to the specified region is set to the portable apparatus 3. In this case, the first received signal intensity value is set as follows. That is, in an arbitrary vehicle, when the portable apparatus 3 is disposed at an arbitrary position where the first received signal intensity is obtained, the portable apparatus 3 is set so as not to include a region that is not affected by saturation or crosstalk, outside the maximum region. Therefore, it is possible to acquire accurate intensity data from the vehicle 1, outside the region B having the first received signal intensity. In addition, as will be described later, the region B becomes a narrow region in which received signal intensities are different from each other inside and outside the vehicle in the vicinity of the door 1a, which makes it possible to set threshold values to intensity data for the outside and the inside of the vehicle. As long as the position of the region B can be determined, the region B may be expanded to a region that is not affected by saturation or crosstalk. The internal data group and the external data group are acquired outside the region β that is specified to have the first received signal intensity, and parameters for calculating a Mahalanobis distance are calculated from the internal and external data groups. Then, the parameters are stored in the memory 13.

For the door neighborhood internal data group (which corresponds to a limited region in claims), the portable apparatus 3 is positioned inside the vehicle 1 in the specified region β to acquire intensity data. A computing process that does not use intensity data from the transmitting antenna 15e or that has little influence on the parameters even though the intensity data is used is used to calculate the parameters corresponding to a Mahalanobis reference point for calculating the Mahalanobis distance. Then, the parameters for calculating the Mahalanobis distance to the calculated door neighborhood internal data group and a boundary value of the Mahalanobis distance that is considered to be included in the door neighborhood internal data group are stored in the memory 13.

Figure 9:
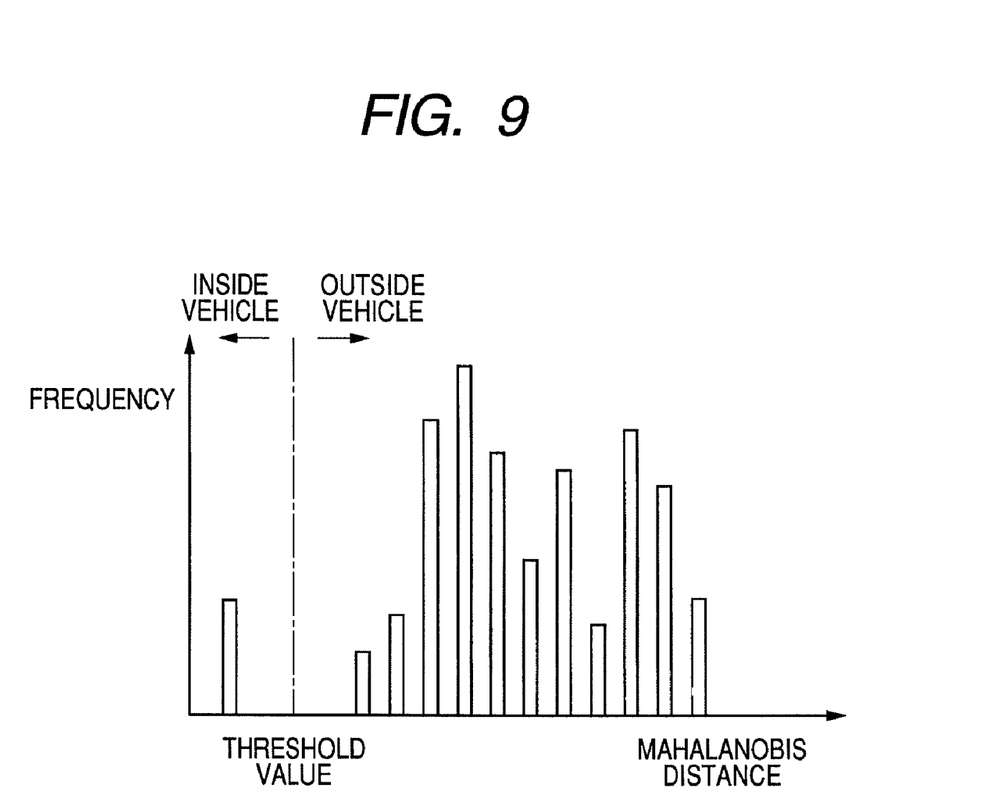
FIG. 9 is a graph illustrating the Mahalanobis distance in the vicinity of an antenna that is provided in a door handle.

However, in the region β that is specified by the intensity data transmitted from the transmitting antenna 15e, the boundary value can be set to the Mahalanobis distance acquired from the intensity data from the transmitting antennas provided in the vehicle since data for the region B and data for the region C are separated from each other, as can be seen from FIG. 9. The threshold value can be set because a metal plate forming the door 1a that isolates the inside of the vehicle from the outside is prevent radio waves transmitted from the internal transmitting antennas that are used to measure the Mahalanobis distance from leaking from the region. Assuming that the range of the door neighborhood internal data group is moved upward, it is difficult to set the boundary value between the inside and the outside of the vehicle. Therefore, the structure is effective for a case in which the intensities of radio waves transmitted from a specific antenna are different from each other outside and inside the vehicle, as in this embodiment.

In order to determine the position of the portable apparatus 3 that is disposed in the region β (except for the regions A, B, and C), each of the transmitting antennas 15 continuously transmits signals at predetermined time intervals, and the portable apparatus 3 receives the signals transmitted from each transmitting antenna 15 to determine which transmitting antenna transmits the intensity data and measures the intensity data. Then, the portable apparatus 3 transmits a signal including information on the measured result to the vehicle. The in-vehicle apparatus specifies the position of the portable apparatus 3 using four data components having the highest signal intensity, and calculates the Mahalanobis distance between the intensity data and the internal data group and the Mahalanobis distance between the intensity data and the external data group on the basis of the parameters stored in the memory 13. Then, the in-vehicle apparatus determines which of the Mahalanobis distances is short, that is, the data group closer to the intensity data, and determines that the portable apparatus 3 is positioned in the data group closer to the intensity data.

When it is determined that the portable apparatus 3 is positioned in any one of the regions A, B, and C in the region β on the basis of intensity data transmitted from only the transmitting antenna 15e, the in-vehicle apparatus performs a computing process that can exclude or ignore the transmitting antenna 15e provided in the door handle 1c, and calculates the Mahalanobis distance between the intensity data and the door neighborhood internal data group, on the basis of the parameters stored in the memory 13 and radio waves having the highest intensity that are transmitted from the transmitting antennas 15 except the transmitting antenna 15e, that is, radio waves transmitted from three antennas provided inside the vehicle. Then, the in-vehicle apparatus determines whether the calculated value is larger than the boundary value stored in the memory 13. When the calculated value is smaller than the boundary value, the in-vehicle apparatus determines that the portable apparatus 3 is positioned in the region C, that is, inside the vehicle. On the other hand, when the calculated value is larger than the boundary value, the in-vehicle apparatus determines that the portable apparatus 3 is positioned in the region A or the region B, that is, outside the vehicle.

Figure 6:
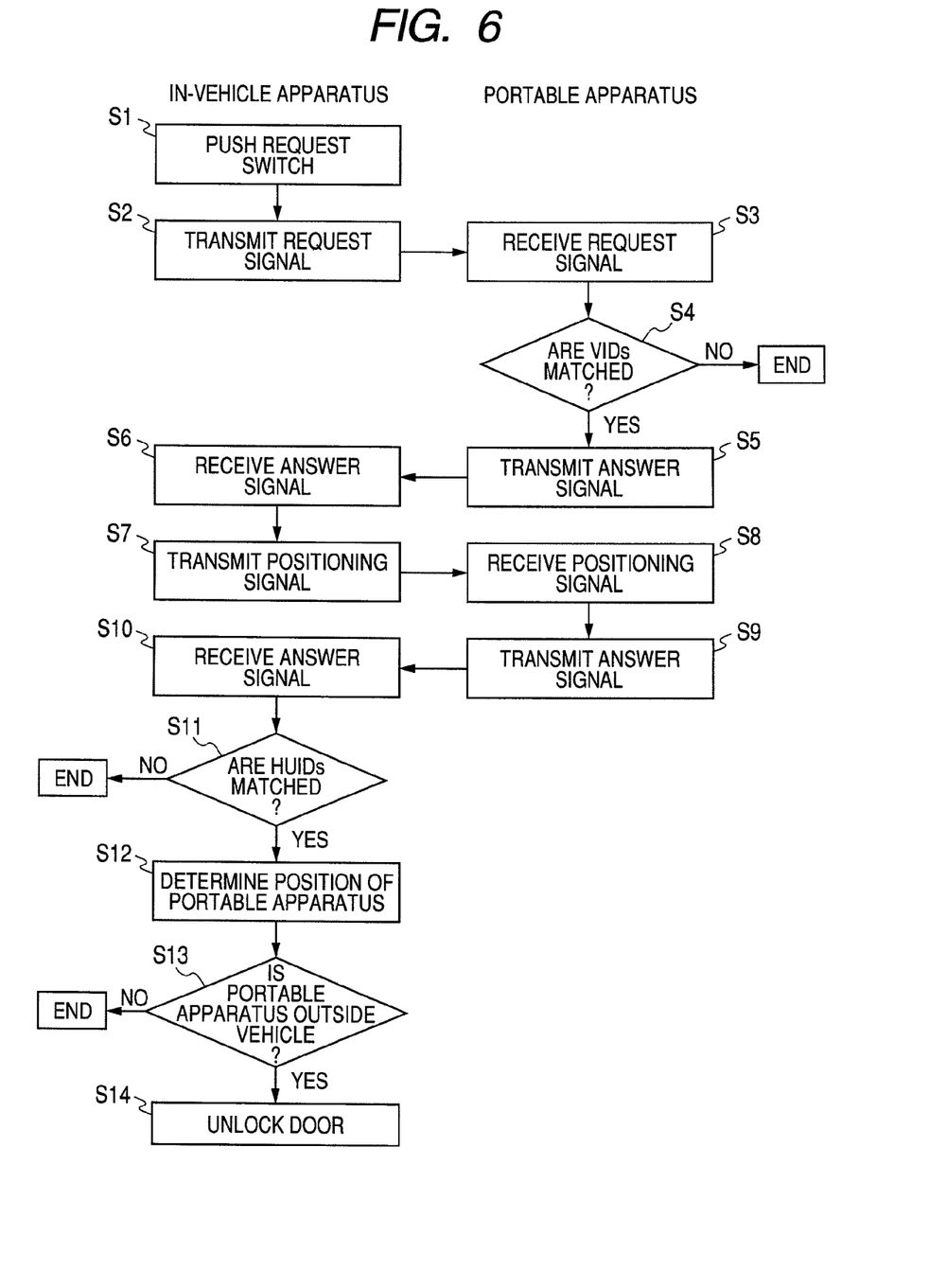
FIG. 6 is a flow chart illustrating a door unlocking process.
Figure 7:
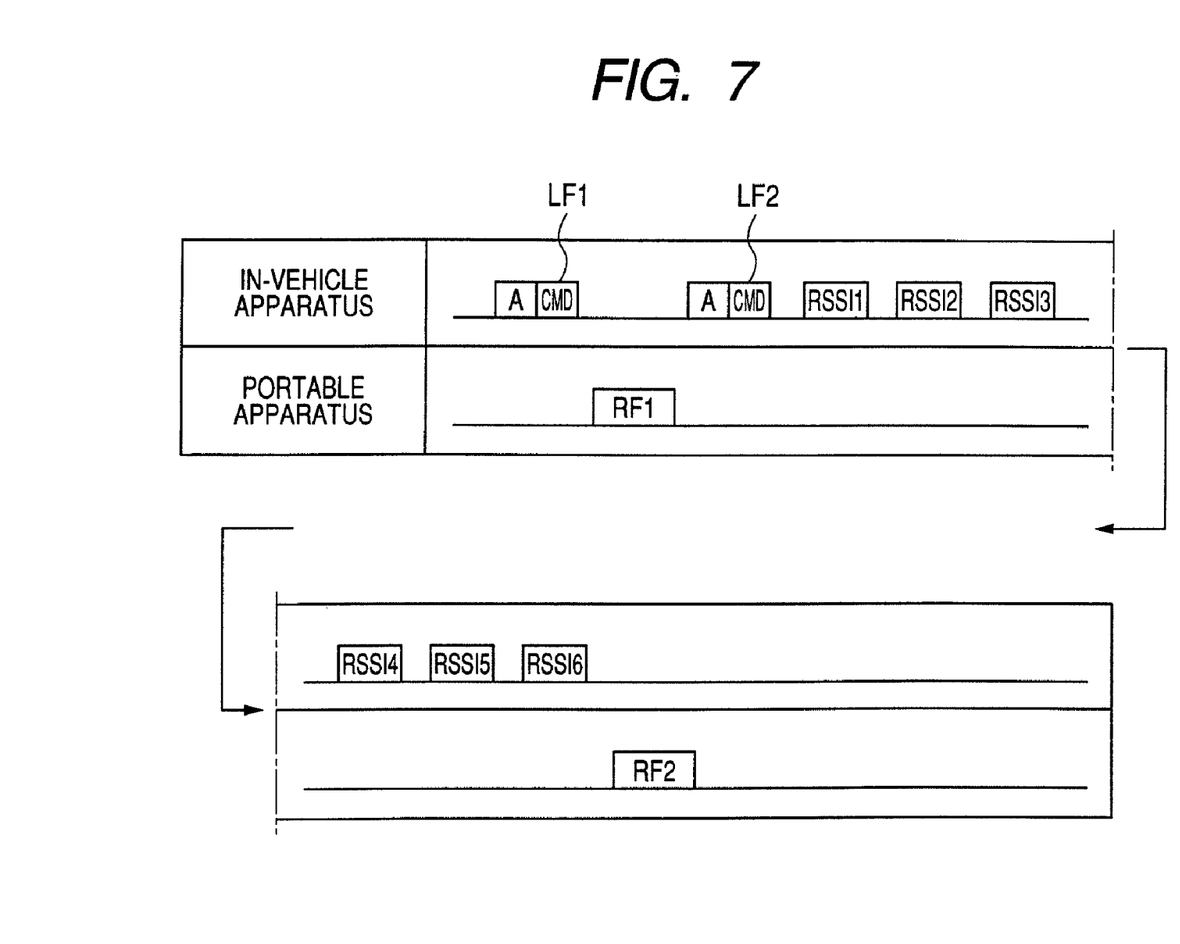
FIG. 7 is a diagram illustrating signals transmitted between the in-vehicle apparatus and the portable apparatus.

Next, the operation of the keyless entry apparatus will be described. FIG. 6 is a flow chart illustrating the operation of the keyless entry apparatus when unlocking the door. FIG. 7 is a diagram illustrating signals transmitted between the in-vehicle apparatus 2 and the portable apparatus 3 in the procedure shown in FIG. 6. In the keyless entry apparatus according to this embodiment, when the request switch 16 provided in the vehicle 1 is pushed, wireless communication is performed between the in-vehicle apparatus 2 and the portable apparatus 3 to unlock the door. First, the user pushes the request switch 16 of the vehicle 1 to start a door unlocking process (S1).

When the request switch 16 is pushed, the in-vehicle control unit 12 controls the in-vehicle transmitter 11 to transmit a request signal LF1 (S2). As shown in FIG. 7, the request signal LF1 is composed of a signal A including the wake-up signal and a command signal CMD. The command signal CMD includes information on V-ID, which is a vehicle ID.

In the portable apparatus 3, when the portable apparatus receiver 20 receives the request signal LF1, the portable apparatus control unit 22 is switched from a sleep state to a normal state by the wake-up signal, and determines whether the V-ID included in the request signal LF1 is matched with V-ID stored therein. When the V-IDs are not matched with each other, the process ends. When the V-IDs are matched with each other, the portable apparatus control unit 22 controls the portable apparatus transmitter 21 to transmit an answer signal RF1 (S5).

When the in-vehicle receiver 10 receives the answer signal RF1 (S6), the in-vehicle control unit 12 controls the in-vehicle transmitter 11 to transmit a positioning signal LF2. As shown in FIG. 7, the positioning signal LF2 includes a wake-up signal, similar to the request signal LF1, and further includes a signal A including an ID of the portable apparatus, a signal including the command signal CMD, and a plurality of Rssi measuring signals that are sequentially transmitted from the transmitting antenna 15a to 15f.

As shown in FIG. 7, the Rssi measuring signals transmitted from the transmitting antennas 15a to 15f are pulse signals that have predetermined intensities and are continuously generated at predetermined time intervals, and are used for the portable apparatus 3 to measure received signal intensity. After a predetermined time has elapsed after the reception of the signal RF1 from the portable apparatus, the in-vehicle transmitter 11 transmits the Rssi measuring signals at predetermined time intervals in a predetermined order through the transmitting antennas 15a to 15f. The portable apparatus 3 stores information on the antennas that transmit signals and the timing when the signals are transmitted from the antennas after the in-vehicle receives the signal RF1, and starts a timer after receiving the signal RF1 to measure the time to receive the signal. Then, the portable apparatus 3 compares the stored information with the measured time to determine the transmitting antennas 15 transmitting the Rssi measuring signals.

The portable apparatus receiver 20 of the portable apparatus 3 receives the positioning signal LF2 including the Rssi measuring signals transmitted from the transmitting antennas 15a to 15f (S8). As described above, the portable apparatus control unit 22 measures the intensity of each of the Rssi measuring signals using the triaxial antenna 23, and transmits information on intensity data for each transmitting antenna that is measured by the triaxial antenna 23 to the in-vehicle apparatus 2 as the answer signal RF2 (S9). The answer signal RF2 includes HU-ID, which is a unique ID of each portable apparatus. In this embodiment, the portable apparatus 3 measures the intensity of the Rssi measuring signals transmitted from the vehicle 1, but the invention is not limited thereto. The portable apparatus 3 may measure the intensity of the request signal transmitted from the vehicle 1. Alternatively, the portable apparatus 3 may calculate the Mahalanobis distance, and transmit the Mahalanobis distance to the vehicle 1.

The in-vehicle transmitter 11 of the in-vehicle apparatus 2 receives the answer signal RF2 from the portable apparatus 3 (S10). When receiving the answer signal RF2, the in-vehicle control unit 12 determines whether HU-ID included in the received signal is matched with that stored in the vehicle (S11). As the result of the determination, when the HU-ID is not matched with that stored in the vehicle, the process ends. On the other hand, when the HU-ID is matched with that stored in the vehicle, the in-vehicle control unit 12 determines the position of the portable apparatus 3 (S12).

During the process of transmitting or receiving the request signal LF1, the portable apparatuses 3 transmit the answer signals RF1 at different timings after receiving the request signal LF1, and the in-vehicle control unit measures the timings to determine which of the portable apparatuses 3 transmits the answer signal, thereby easily and rapidly specifying the portable apparatus 3. During the process of transmitting or receiving the request signal LF2, the in-vehicle control unit performs an accurate authentication process and a position confirming process on the portable apparatus 3, on the basis of an ID of the portable apparatus having a larger amount of information than its initial state, which is extracted from the request signal LF1. When the authentication fails, the in-vehicle control unit performs the same operation on the portable apparatuses 3. Alternatively, the process of specifying portable apparatus 3 using the request signal LF1 may be omitted, and only the process of authenticating the portable apparatus 3 may be performed, or the authentication of the portable apparatuses 3 may be performed after the Rssi measuring signals are transmitted.

Figure 8:
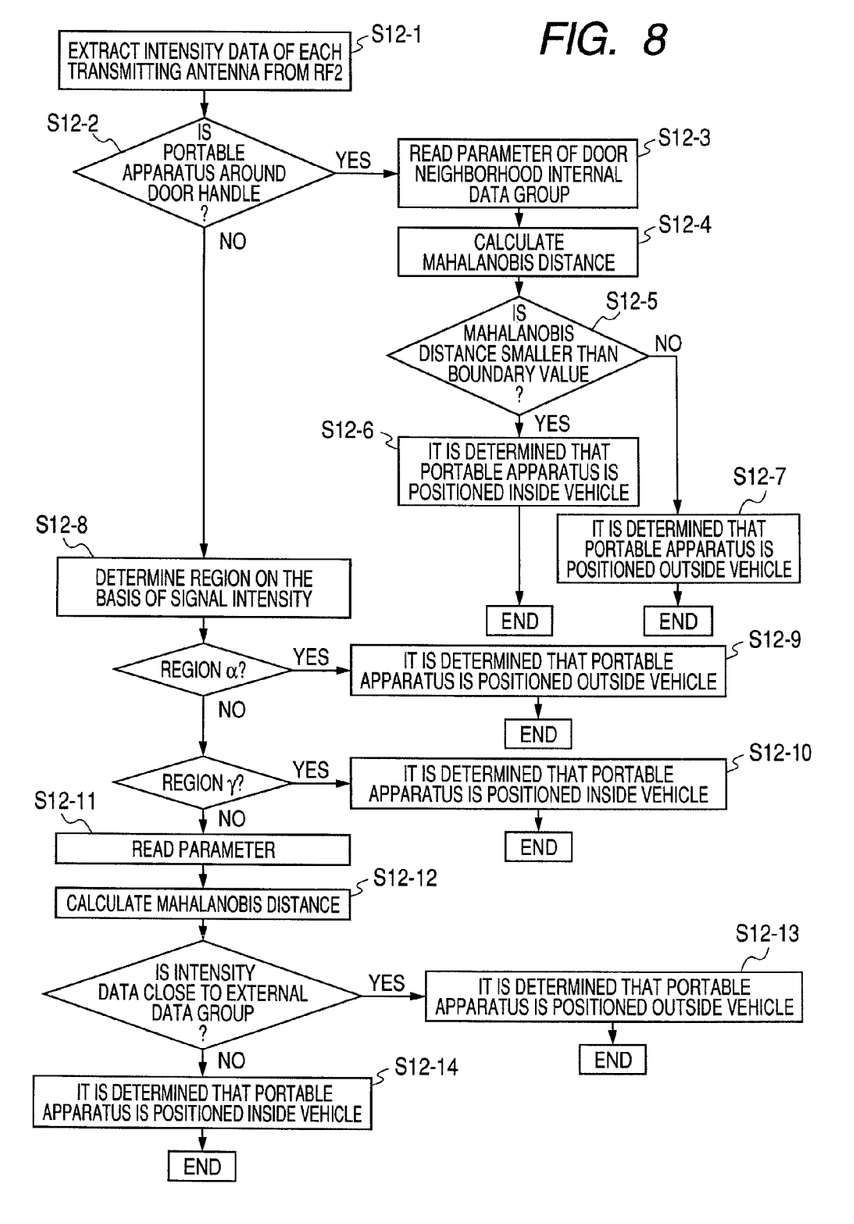
FIG. 8 is a flow chart illustrating a position determining process of the portable apparatus.

The position of the portable apparatus 3 is determined as follows. FIG. 8 is a flow chart illustrating a process of determining the position of the portable apparatus 3. First, the in-vehicle control unit 12 extracts intensity data and ID information included in the answer signal RF2 that is transmitted from the portable apparatus 3 (S12-1). In this process, the in-vehicle control unit 12 determines the position of the portable apparatus 3 in the regions A, B, and C in the vicinity of the door handle 1c, on the basis of intensity data for the transmitting antenna 15e provided in the door handle 1c (S12-2). The position of the portable apparatus 3 may be determined according to whether the value of the intensity data for the transmitting antenna 15e is larger than a predetermined value.

When it is determined that the portable apparatus 3 is positioned in any one of the regions A, B, and C, the in-vehicle control unit 12 reads parameters required to calculate the Mahalanobis distance between intensity data and the door neighborhood internal data group from the memory 13 (S12-3), and calculates the Mahalanobis distance between the door neighborhood internal data group and intensity data that is transmitted from the transmitting antennas 15 other than the transmitting antenna 15e to the portable apparatus 3 (S12-4). Then, the in-vehicle control unit 12 reads from the memory 13 the boundary value that is considered as the door neighborhood internal data group, and determines whether the calculated Mahalanobis distance value is larger than the boundary value (S12-5).

When the calculated Mahalanobis distance value is smaller than the boundary value, the in-vehicle control unit 12 determines that the intensity data obtained by the portable apparatus 3 is included in the door neighborhood internal data group and thus the portable apparatus 3 is positioned in the region C, that is, inside the vehicle (S12-6). Then, the process ends. On the other hand, the calculated Mahalanobis distance value is larger than the boundary value, the in-vehicle control unit 12 determines that the intensity data obtained by the portable apparatus 3 is not included in the door neighborhood internal data group and thus the portable apparatus 3 is positioned in the region A or B, that is, outside the vehicle (S12-7). Then, the process ends.

When it is determined in Step S12-2 that the portable apparatus 3 is not positioned in any of the regions A, B, and C, the following process is performed. The in-vehicle control unit 12 specifies intensity and a transmitting antenna on the basis of data included in the answer signal RF2 that is transmitted from the portable apparatus 3. Then, the in-vehicle control unit 12 determines the intensity, thereby determining whether the portable apparatus 3 is positioned in the region α, β, or γ of the vehicle 1 shown in FIG. 4 (S12-8). In this embodiment, the position of the portable apparatus 3 is calculated from the relationship between intensity data that is acquired beforehand and the distances to the transmitting antennas 15. Therefore, it is possible to obtain sufficient positional accuracy to determine the position of the portable apparatus 3 inside or outside the vehicle.

When it is determined that the portable apparatus 3 is positioned in the region α, the in-vehicle control unit 12 determines that the portable apparatus 3 is positioned outside the vehicle (S12-9), and ends the position determining process. When it is determined that the portable apparatus 3 is positioned in the region γ, the in-vehicle control unit 12 determines that the portable apparatus 3 is positioned inside the vehicle (S12-10), and ends the position determining process. As shown in FIG. 4, the regions α and γ are spaced from the interface between the inner surface and the outer surface of the vehicle by a predetermined distance. Therefore, when it is determined in Step S12-8 that the portable apparatus 3 is positioned in the region α or the region γ, it is possible to obtain sufficient positional accuracy to determine the position of the portable apparatus 3.

Meanwhile, when it is determined that the portable apparatus 3 is positioned in the region β, not in the regions α and γ, the in-vehicle control unit 12 reads from the memory 13 parameters required to calculate the Mahalanobis distance (S12□11), and calculates the Mahalanobis distance between intensity data obtained from the portable apparatus 3 and the internal data group and the Mahalanobis distance between the intensity data obtained from the portable apparatus 3 and the external data group (S12-12). The position of the portable apparatus 3 may be determined according to whether the calculated Mahalanobis distance value is smaller or larger than a predetermined value, or whether the calculated Mahalanobis distance value is equal to or smaller than, or larger than the predetermined value.

When the Mahalanobis distance between the intensity data obtained from the portable apparatus 3 and the internal data group is longer than the Mahalanobis distance between the intensity data and the external data group, the in-vehicle control unit 12 determines that the portable apparatus 3 is positioned outside the vehicle (S12-13), and ends the position determining process. When the intensity data is closer to the internal data group than to the external data group, the in-vehicle control unit 12 determines that the portable apparatus 3 is positioned inside the vehicle (S12-14), and ends the position determining process.

As described above, first, it is determined whether the portable apparatus 3 is positioned in the region which is affected by crosstalk or in which saturation occurs, on the basis of intensity data for the transmitting antenna 15e that is provided in the door handle 1c. When the portable apparatus 3 is positioned in the region, it is determined whether intensity data for the transmitting antennas other than the transmitting antenna 15e is included in the door neighborhood internal data group, and it is determining whether the portable apparatus is positioned inside or outside the vehicle on the basis of the result of the determination. Therefore, it is possible to determine whether the portable apparatus 3 is positioned inside or outside the vehicle 1 without using abnormal intensity data generated due to crosstalk or saturation, and thus prevent errors in the determination of the position of the portable apparatus 3. The area of the region in which the crosstalk or saturation occurs or the influence of the region varies for each vehicle 1, but intensity data inside the vehicle varies little. In this embodiment, in the region that is affected by crosstalk or saturation, it is determined whether acquired intensity data is included in the data group for the internal region of the vehicle to determine the position of the portable apparatus 3. Therefore, it is possible to accurately determine the position of the portable apparatus 3 inside and outside the vehicle without being affected by a variation in crosstalk or saturation.

When the portable apparatus 3 is positioned outside the region that is affected by the crosstalk or saturation, a simple and easy method is used to determine the position of the portable apparatus 3. When the portable apparatus 3 is positioned in an internal region or an external region of the vehicle that is spaced from the interface between the internal surface and the outer surface of the vehicle by a predetermined distance, a position determining process is immediately performed on the basis of the result of the determination of the region. When the portable apparatus 3 is positioned in a neighboring region of the interface between the inner surface and the outer surface of the vehicle, the Mahalanobis distance is calculated, and the position of the portable apparatus 3 is determined on the basis of the Mahalanobis distance. Therefore, detailed data for calculating the Mahalanobis distance can be acquired from only the vicinity of the interface between the inner surface and the outer surface of the vehicle, which makes it possible to considerably reduce the number of processes. When the portable apparatus 3 is positioned in a region that is spaced from the interface between the inner surface and the outer surface of the vehicle by a predetermined distance, it is possible to determine the position of the portable apparatus without calculating the Mahalanobis distance, and thus shorten the time required to perform processes.

The in-vehicle control unit 12 performs different control processes according to whether the portable apparatus 3 is positioned inside or outside the vehicle 1 (S13). When it is determined that the portable apparatus 3 is not positioned outside the vehicle 1, that is, the portable apparatus 3 is positioned inside the vehicle 1, the process ends.

When the user having the portable apparatus 3 is positioned outside the vehicle 1, the user pushes the request switch 16 to unlock the door. However, when the user who has the portable apparatus 3 and is positioned inside the vehicle 1 unlocks the door, any person who does not have the portable apparatus 3 can push the request switch 16 to unlock the door. In order to prevent this, when the portable apparatus 3 is positioned outside the vehicle 1, the door is not unlocked.

When it is determined that the portable apparatus 3 is positioned outside the vehicle 1, an unlocking command signal is output to a door locking apparatus (not shown) to unlock the door (S14). Since the position of the portable apparatus 3 is determined on the basis of the Mahalanobis distances from the internal data group and the external data group, it is possible to accurately determine the position of the portable apparatus 3 and thus reduce errors in an unlocking operation.

In this embodiment, the request switch 16 is pushed to unlock the door. This may be similarly applied to a door locking operation. That is, in order to lock the door, the position of the portable apparatus 3 may be determined, and control may be performed on the basis of result of the determination. In addition, the invention is not limited to the door locking and unlocking operations, but it may be applied to an operation of starting an engine according to the position of the portable apparatus 3. In this case, the position of the portable apparatus 3 is determined and the engine is operated according to the result of the determination.

In this embodiment, the Mahalanobis distance is used to accurately determine the position of the portable apparatus 3. However, methods other than the method of calculating the Mahalanobis distance may be used to determine the position of the portable apparatus in the regions A, B, and C that are affected by crosstalk and saturation as long as they can determine whether acquired intensity data is included in the door neighborhood internal data group. Further, in this embodiment, when the portable apparatus 3 is positioned outside the region that is affected by crosstalk and saturation, the positions of the regions α, β, and γ are roughly determined, and then the position of the region β and the positions of the regions α and γ are determined by different methods. However, the same determining method may be used to determine the positions of regions other than the regions α, β, and γ, without roughly determining the positions of the regions.

Although the exemplary embodiment of the invention has been described above, the invention is not limited thereto, but various modifications and changes can be made without departing from the scope and spirit of the invention. In this embodiment, the transmitting antenna is specified on the basis of the signal RF1 transmitted from the portable apparatus, but the invention is not limited thereto. For example, signals Rssi1 to Rssi6 including identification information of each transmitting antenna may be transmitted; or immediately after receiving the signal Rssi, the portable apparatus may transmit intensity data to the vehicle as an answer signal, and the in-vehicle apparatus may identify the portable apparatus. In addition, in this embodiment, as shown in FIG. 4, three transmitting antennas 15 are provided in each of the inside and the outside of the vehicle 1, but the arrangement and number of transmitting antennas 15 are not limited thereto. For example, one or more transmitting antennas may be provided in each of the inside and the outside of the vehicle 1, except for the transmitting antenna 15e provided in the door handle 1c. However, as the number of transmitting antennas 15 increases, the position of the portable apparatus can be more accurately determined. In this embodiment, four data components having the highest signal intensity that are transmitted from the transmitting antennas 15 are selected, and the data components are used to determine the position of the portable apparatus, but the number of data components is not limited to four. All of the data components transmitted from the transmitting antennas may be used to determine the position of the portable apparatus.

Furthermore, this embodiment is configured to exclude the influence of crosstalk and saturation in the vicinity of the transmitting antenna 15e provided in the door handle 1c, but the invention is not limited thereto. When the transmitting antenna 15 is provided outside a trunk room that is disposed on the rear side of the vehicle 1, errors in the determination of the position of the portable apparatus 3 may occur due to crosstalk and saturation generated in the vicinity of the trunk room. Therefore, in the region that is affected by the crosstalk and saturation, it is determined whether acquired intensity data is included in the internal data group or the external data group of the vehicle, and then it is determined whether the portable apparatus is positioned inside or outside the vehicle on the basis of the result of the determination, which makes it possible to exclude the influence of crosstalk and saturation in the vicinity of the trunk room.

Further, in this embodiment, the transmitting antenna is provided in only the driver-side door handle, but the invention is not limited thereto. The transmitting antennas may be provided in both the driver-side and passenger-side door handles to determine the position of the portable apparatus.

In this embodiment, when the door neighborhood internal data group is created and when it is determined whether the acquired intensity data is included in the door neighborhood internal data group, data for the transmitting antenna 15e that causes the crosstalk and saturation is excluded, and data for the other transmitting antennas 15 are used. When all of the intensity data components are not affected even though the intensity data for the transmitting antenna 15e is included, the intensity data for the transmitting antenna 15e may not be excluded.

Furthermore, in this embodiment, the in-vehicle control unit 12 of the in-vehicle apparatus 2 calculates the Mahalanobis distance between data from the portable apparatus 3 and each data group, but the invention is not limited thereto. The same memory as the memory 13 may be provided in the portable apparatus 3, and parameters for calculating the Mahalanobis distance may be stored in the memory. The portable apparatus control unit 22 may calculate the Mahalanobis distance to determine the position of the portable apparatus 3.

Further, each data group may be stored in the memory 13. In this case, the Mahalanobis distance is calculated on the basis of the data groups stored in the memory, in order to determine the position of the portable apparatus 3. In this embodiment, a method of calculating the Mahalanobis distance is used as a position determining method, but the invention is not limited thereto. For example, a linear determining method may be used as the position determining method. However, the method of calculating the Mahalanobis distance can determine the position of the portable apparatus more accurately than the other determining methods. A neural network may be used to determine the position of the portable apparatus on the basis of a plurality of data, instead of the method of calculating the Mahalanobis distance.

In this embodiment, the threshold value is used to determine whether the portable apparatus is positioned inside or outside the vehicle in a predetermined limited region of the transmitting antenna 15e, but the invention is not limited thereto. The invention may be applied to determine whether the portable apparatus is positioned inside or outside a predetermined interface, such as an interface between the inner surface and the outer surface of the vehicle.

The invention claimed is:

1. A keyless entry apparatus comprising:
an in-vehicle apparatus that is provided in a vehicle; and
a portable apparatus,
wherein the in-vehicle apparatus includes:
an in-vehicle transmitter that is connected to a plurality of transmitting antennas that transmits request signals;
an in-vehicle receiver that receives an answer signal; and
an in-vehicle control unit that, when an answer signal transmitted from the portable apparatus is authenticated, performs a predetermined control process,
the portable apparatus includes:
a portable apparatus receiver that receives the request signals;
a portable apparatus transmitter that transmits the answer signal; and
a portable apparatus control unit that detects the intensity of each of the signals transmitted from the plurality of transmitting antennas of the in-vehicle apparatus,
when the in-vehicle control unit detects that the portable apparatus is positioned in a predetermined limited region in the vicinities of some of the plurality of transmitting antennas on the basis of intensity data from some of the plurality of transmitting antennas that is detected by the portable apparatus control unit, the in-vehicle control unit determines whether intensity data from the other transmitting antennas that is detected by the portable apparatus is included in a limited data group composed of a plurality of intensity data that are transmitted from the other transmitting antennas and then received by the portable apparatus when the portable apparatus is positioned along the inside of an interface between an inner surface and an outer surface of the vehicle in the predetermined limited region,
when it is determined that the intensity data is included in the limited data group, the in-vehicle control unit determines that the portable apparatus is positioned inside the vehicle, and
when it is determined that the intensity data is not included in the limited data group, the in-vehicle control unit determines that the portable apparatus is positioned outside the vehicle,
wherein, when the in-vehicle control unit detects that the portable apparatus is positioned outside the predetermined limited region in the vicinities of some of the plurality of transmitting antennas on the basis of the intensity data from some of the plurality of transmitting antennas that is detected by the portable apparatus control unit, the in-vehicle control unit determines whether the intensity data that is detected by the portable apparatus control unit is close to a first data group, which includes a plurality of intensity data that are transmitted from the plurality of transmitting antennas and then received by the portable apparatus and excludes intensity data in the predetermined limited region in the vicinities of the transmitting antennas when the portable apparatus is positioned along the outside of the interface between the inner surface and the outer surface of the vehicle, or a second data group, which includes a plurality of intensity data that are transmitted from the plurality of transmitting antennas and then received by the portable apparatus and excludes intensity data in the predetermined limited region in the vicinities of the transmitting antennas when the portable apparatus is positioned along the inside of the interface between the inner surface and the outer surface of the vehicle, and
the in-vehicle control unit determines whether the portable apparatus is positioned inside or outside the vehicle on the basis of the result of the determination.

2. The keyless entry apparatus according to claim 1, wherein the in-vehicle control unit calculates Mahalanobis distances between the intensity data detected by the portable apparatus control unit and the first and second data groups, and the in-vehicle control unit determines that the intensity data is close to the data group having a shorter Mahalanobis distance.

3. The keyless entry apparatus according to claim 1, wherein some of the transmitting antennas are provided in a door handle provided on the outer surface of the vehicle.

4. The keyless entry apparatus according to claim 1, wherein some of the transmitting antennas are provided outside a trunk room of the vehicle.

5. The keyless entry apparatus according to claim 1, wherein the predetermined limited region in the vicinity of the transmitting antenna is a region in which at least one of crosstalk between radio field intensities and saturation occur.

* * * * *